US010798876B2

(12) United States Patent
Milus et al.

(10) Patent No.: US 10,798,876 B2
(45) Date of Patent: Oct. 13, 2020

(54) OSCILLATING GARDENING DEVICE, GEAR ELEMENT OF AN OSCILLATING GARDENING DEVICE AND METHOD USING AN OSCILLATING GARDENING DEVICE (71) Applicant: Robert Bosch GmbH, Stuttgart (DE)

(72) Inventors: Thomas Milus, Miskolc (HU); Robert Soltesz, Miskolc (HU); Janos Nagy, Meznagymihaly (HU); Peter Heywood, Norton (GB); John Lister, Bury St. Edmunds (GB)

(73) Assignee: Robert Bosch GmbH, Stuttgart (DE)

( * ) Notice: Subject to any disclaimer, the term of this patent is extended or adjusted under 35 U.S.C. 154(b) by 89 days.

(21) Appl. No.: 15/744,038

(22) PCT Filed: Aug. 10, 2016

(86) PCT No.: PCT/EP2016/069013
§ 371 (c)(1),
(2) Date: Jan. 11, 2018

(87) PCT Pub. No.: WO2017/032602
PCT Pub. Date: Mar. 2, 2017

(65) Prior Publication Data
US 2018/0199518 A1 Jul. 19, 2018

(30) Foreign Application Priority Data
Aug. 26, 2015 (DE) .................. 10 2015 216 251

(51) Int. Cl.
A01G 3/053 (2006.01)
F16H 21/22 (2006.01)
A01G 3/04 (2006.01)

(52) U.S. Cl.
CPC ............ A01G 3/053 (2013.01); F16H 21/22 (2013.01); A01G 2003/0461 (2013.01)

(58) Field of Classification Search
CPC ...... A01G 3/04; A01G 3/0461; A01G 3/0475; A01G 3/0408; A01G 3/053; Y10T 74/1828; B23D 49/006
(Continued)

(56) References Cited

U.S. PATENT DOCUMENTS 1,937,049 A * 11/1933 Toland ..................... B26D 3/20
83/409.1
2,070,633 A * 2/1937 Topham .................. F16H 25/16
74/53
(Continued)

FOREIGN PATENT DOCUMENTS

DE 691 19 387 T2 9/1996
DE 10 2007 059 135 A1 7/2008
(Continued)

OTHER PUBLICATIONS

International Search Report corresponding to PCT Application No. PCT/EP2016/069013, dated Nov. 7, 2016 (German and English language document) (5 pages).

Primary Examiner — Jason Daniel Prone
Assistant Examiner — Samuel A Davies
(74) Attorney, Agent, or Firm — Maginot, Moore & Beck LLP (57) ABSTRACT An oscillating gardening device includes a drive unit and at least one cam gear that is configured to be driven by the drive unit and has at least one guide section configured to guide at least one element. The guide section is rotatable about an axis of rotation and closed relative to the rotation axis in the circumferential direction. The guide section is arranged eccentrically with respect to the axis of rotation and deviates at least substantially from one or more of a circular shape and a circular ring shape in the circumferential direction. The oscillating gardening device in at least one
(Continued)

embodiment is configured as one or more of hedge shears, grass shears, and branch shears.

9 Claims, 10 Drawing Sheets

(58) Field of Classification Search
USPC ..................................... 30/217; 56/296, 297
See application file for complete search history.

(56) References Cited

U.S. PATENT DOCUMENTS

| | | | | |
|---|---|---|---|---|
| 4,023,334 | A * | 5/1977 | Heath ................... | A01D 34/135 56/297 |
| 5,161,420 | A * | 11/1992 | Feng ....................... | A63H 13/20 74/53 |
| 6,698,177 | B1 | 3/2004 | Akehi et al. | |
| 2012/0167394 | A1* | 7/2012 | Lugert ................... | A01G 3/053 30/216 |
| 2013/0031785 | A1* | 2/2013 | Kaupp ................... | A01G 3/053 30/208 |
| 2013/0199316 | A1* | 8/2013 | Magnard ................. | B62M 3/04 74/45 |
| 2013/0326885 | A1* | 12/2013 | Kaupp ................... | A01G 3/053 30/208 |

FOREIGN PATENT DOCUMENTS

| | | |
|---|---|---|
| EP | 0 170 849 A1 | 2/1986 |
| JP | 2008-220243 A | 9/2008 |
| JP | 2013-066405 A | 4/2013 |
| RU | 2 206 196 C1 | 6/2003 |

\* cited by examiner

OSCILLATING GARDENING DEVICE, GEAR ELEMENT OF AN OSCILLATING GARDENING DEVICE AND METHOD USING AN OSCILLATING GARDENING DEVICE

This application is a 35 U.S.C. § 371 National Stage Application of PCT/EP2016/069013, filed on Aug. 10, 2016, which claims the benefit of priority to Serial No. DE 10 2015 216 251.6, filed on Aug. 26, 2015 in Germany, the disclosures of which are incorporated herein by reference in their entirety.

BACKGROUND

From DE 691 19 387 T2, a hedge trimmer which comprises a drive unit and a cam mechanism driven by the drive unit is known. The cam mechanism is provided to convert a rotary movement of an output shaft of the drive unit into an axial movement for driving at least one blade of a processing tool of the hedge trimmer. The cam mechanism has a disk-shaped gear element in the form of an equilateral triangle which is provided with epitrochoidal sides and engages in a corresponding recess of an element of the cam mechanism, which element is to be guided.

SUMMARY

The disclosure is based on an oscillating gardening device, in particular a hedge trimmer, shrub shears, grass shears and/or pruning shears, having a drive unit and having at least one cam mechanism which is drivable by the drive unit and has at least one guide portion for at least one element to be guided, wherein the guide portion is configured such that it is rotatable about a rotational axis and is closed with respect thereto in the peripheral direction.

It is proposed that the guide portion is arranged eccentrically to the rotational axis, and in the peripheral direction, in particular when viewed in a direction parallel to the rotational axis, deviates at least substantially from a circular or annular shape, whereby advantageous characteristics in relation to gardening, in particular advantageous cutting characteristics, can be attained. In particular, cutting quality, cutting capacity and/or cutting efficiency, in particular in hedge cutting, can be increased, in particular by strong, fast and clean cuts, as well as by high efficiency across a wide range of branch thicknesses. Furthermore, by an appropriate shaping of the guide portion, a movement of a processing tool of the oscillating gardening device can be influenced. The movement can in particular be adapted to the respective requirements. In addition, a simple design can be enabled.

By "an oscillating gardening device" should in this context be understood, in particular, a gardening device which has at least one processing tool which in at least one operating state is driven in oscillation cycles, in particular by means of the drive unit and/or the cam mechanism, and which in particular has a processing tool which is provided to at least partially execute an oscillating movement in which, in particular, a motional direction changes in particular periodically. Preferably, the oscillating gardening device is a hand-held or hand-guided gardening device. By a "processing tool" should be understood, in particular, an insert tool which is provided to at least aid, and preferably perform, a gardening task, preferably a cutting task. The processing tool here preferably has at least one blade, and preferably at least two blades, which, in particular in cooperation with one another, are provided to at least aid, and preferably perform, the gardening task, preferably the cutting task. In this, only one of the at least two blades, or else both blades, can be driven. In an operating state, the two blades can move on the one hand in the longitudinal direction, but also in the transverse direction, at least substantially parallel to each other.

By a processing tool being "driven in oscillation cycles" should be understood, in particular, that at least one element, preferably at least one blade, of the processing tool is driven oscillatingly, in particular periodically, in particular with an oscillation frequency and an oscillation period duration, in particular by the drive unit. The drive unit can here comprise at least one internal combustion engine and/or preferably at least one electric motor. By "at least substantially parallel" should here be understood, in particular, an orientation of a direction relative to a reference direction, in particular in one plane, wherein the direction, in relation to the reference direction, has a deviation less than 8°, in particular less than 5°, preferably less than 2°, and particularly advantageously of 0°.

By a "cam mechanism" should be understood, in particular, a unit which has at least two mutually cooperating gear elements, of which a first of the gear elements is driven, in particular by the drive unit, and a second of the gear elements, in particular the element to be guided, in at least one operating state, travels along a moving cam, in particular the guide portion, of the first gear element. By a "guide portion" of a cam mechanism should in this context be understood, in particular, a region of at least one gear element of the cam mechanism, which region is provided to provide at least one guide face for a further gear element of the cam mechanism, in particular for the element to be guided. In particular, the element to be guided is mechanically coupled to at least a part, preferably a blade, of the processing tool, and particularly advantageously is connected in one piece to the part. By "in one piece" should be understood, in particular, at least integrally connected, for instance by a welding process, a bonding process, an injection molding process and/or another process which appears sensible to the person skilled in the art, and/or advantageously formed in one piece, such as, for instance, by single-cast production and/or by production in a single-component or multi-component injection molding process, and advantageously from a single blank.

By the guide portion being arranged "eccentrically to the rotational axis" should be understood, in particular, that, when viewed in a direction parallel to the rotational axis, a centroid of the area enclosed by the guide portion is distanced from the rotational axis. By a shape deviating "at least substantially" from a reference shape, in particular a circular and/or annular shape, should be understood, in particular, that the shape deviates with a volume percentage and/or areal percentage of at least 10%, in particular of at least 20%, preferably of at least 30%, and particularly of at least 40%, from the reference shape. By "provided" should be understood, in particular, specially designed and or equipped. By an object being provided for a specific function should be understood, in particular, that the object fulfils and/or executes this specific function in at least one application state and/or operating state.

The guide portion could in particular be configured as a closed guide groove of a gear element configured in particular as a cam disk, wherein the gear element could preferably be configured, at least substantially, in the shape of a disk, in particular a circular disk. The gear element could here be rotatable, in particular about a centrically arranged rotational axis. An unbalance can hereby advantageously be reduced. Furthermore a higher flexibility in terms of possible motional sequences can be realized.

In an alternative embodiment of the disclosure, it is proposed that the cam mechanism comprises at least one eccentric disk, which in particular is provided to at least partially engage in a recess of the element to be guided, preferably an annular opening of the element to be guided, and the guide portion is configured as a, with respect to the rotational axis, radial outer face of the eccentric disk. An advantageously simple design can hereby be achieved. In particular, resort can be made to resort to proven design features. The eccentric disk is here mounted rotatably about a rotational axis which corresponds to the rotational axis of the guide portion. Preferably, the eccentric disk has at least substantially the shape of a cylinder, in particular a vertical cylinder, having a base area which deviates substantially from a circular shape. By a shape corresponding "at least substantially" to a reference shape, in particular a cylindrical shape, should be understood, in particular, that the shape deviates from the reference shape with a volume percentage and/or areal percentage of at most 10%, in particular of maximally 7.5%, preferably of at most 5%, and particularly advantageously of maximally 2.5%. By a, with respect to the rotational axis, "radial outer face of the eccentric disk" should be understood, in particular, an outer surface of the eccentric disk, which surface has at least one normal vector which points away from the rotational axis. Preferably, the normal vector is here at least substantially perpendicular to the rotational axis. Particularly advantageously, the outer face of the eccentric disk is an envelope surface of the vertical cylinder with base area which deviates substantially from a circular shape. The expression "at least substantially perpendicular" should here in particular define an orientation of a direction relative to a reference direction, wherein the direction and the reference direction, in particular viewed in one plane, enclose an angle of between 80° and 100°, in particular between 85° and 95°, preferably between 88° and 92°, and particularly advantageously of 90°.

Advantageously, an extent of the eccentric disk along a direction perpendicular to the rotational axis is equal for all rotational positions of the eccentric disk about the rotational axis. Reliability can hereby advantageously be increased. Furthermore an advantageous movement of the processing tool can be achieved. In particular, the extent of the eccentric disk along the direction corresponds at least substantially to an extent of the recess of the element to be guided, along this direction. By an "extent" of an element should be understood, in particular, a maximum distance apart of two points of a vertical projection of the element onto a plane. In particular, the constant extent moves oscillatingly along the direction during a rotation of the eccentric disk, wherein this oscillating movement is converted by the cam mechanism, in at least one operating state, into an oscillating movement of at least a part of the processing tool.

If the guide portion is free from a mirror symmetry with respect to a mirror symmetry plane containing the rotational axis and/or free from an n-fold rotational symmetry with respect to an rotational symmetry axis parallel to the rotational axis, particularly advantageous characteristics in relation to gardening, in particular particularly advantageous cutting characteristics, can be achieved. By an "n-fold rotational symmetry" with respect to an rotational symmetry axis should in this context be understood, in particular, a symmetry which an object, upon rotation of the object about the rotational symmetry axis through an angle of 360°/n, maps onto the object itself.

Furthermore it is proposed that the guide portion has at least a first segment and at least a second segment different from the first segment, by which segments different processing phases of an oscillation cycle of a processing tool are identified. Flexibility can hereby advantageously be increased, in particular an adaptation can be made to given working conditions. Preferably, the segments here extend with respect to the rotational axis respectively over an angular range of at least 20°, in particular of at least 30°, and preferably of at least 40°. By a "processing phase" of an oscillation cycle should in this context be understood, in particular, a phase of the oscillation cycle in which specific, in particular periodically recurring processes proceed. The processing phase can in particular be constituted by a holding phase and/or a cutting phase and/or a preparation phase. By a "holding phase" should in this context be understood, in particular, a phase of the oscillation cycle in which a movement of the processing tool is at least substantially temporarily halted, preferably in order to at least facilitate take-up of cuttings into a cutting region of the processing tool. By a movement of the processing tool being "at least substantially" halted should be understood, in particular, that relative speeds between parts of the processing tool are at most 1 mm/s, in particular maximally 0.1 mm/s. By a "cutting phase" should be understood, in particular, a phase of the oscillation cycle in which cuttings are cut by the processing tool. By a "preparation phase" should herein be understood, in particular, a phase of the oscillation cycle in which a following step is prepared by an appropriate adjustment and/or setting and/or movement of the processing tool.

In a preferred embodiment of the disclosure, it is proposed that at least one of the segments preferably extends with respect to the rotational axis over an angular range of at least 20°, in particular of at least 30°, and preferably of at least 40°, and describes a circular and/or annular arc with respect to the rotational axis in order to at least substantially temporarily halt a movement of the processing tool during at least one holding phase. A feed of material to be processed, in particular of plant material, into a processing region, in particular a cutting region, can hereby advantageously be improved. In particular, a force applied during the gardening to the material to be processed can be reduced. Furthermore due to the low friction between the blades of the processing tool which is in this case generated, an advantageous acceleration of the drive unit can subsequently be achieved.

In a particularly preferred embodiment of the disclosure, it is proposed that at least one of the segments preferably extends with respect to the rotational axis over an angular range of at least 20°, in particular of at least 30°, and preferably of at least 40°, and describes a part of a spiral in order to provide a preferably accelerated movement of the processing tool during at least one cutting phase. A processing of the material, in particular of the plant material, in particular a cutting of the material, can hereby advantageously be improved. In particular, a fast blade movement can be attained for a clean cut.

In addition, it is proposed that the first segment extends over a first angular range of 30° to 100°, and in particular of 45 to 90°, with respect to the rotational axis, and describes a circular and/or annular arc, and the second segment adjoins in the peripheral direction the first segment, extends over a second angular range of 70° to 110°, and in particular of 80° to 100°, with respect to the rotational axis, and describes a part of a spiral. Particularly advantageous cutting characteristics can hereby be obtained. By a segment of the guide portion "adjoining in the peripheral direction" a further segment of the guide portion should be understood, in particular, that the segment and the further segment directly border each other and in particular have at least one common point.

In a further embodiment of the disclosure, it is proposed that the guide portion has at least a third segment different from the first segment and second segment, which third segment adjoins in the peripheral direction the first segment, extends over a third angular range of 30° to 60°, in particular of 40° to 50°, with respect to the rotational axis, and describes a part of a spiral. A further optimization and adaptation to working conditions can hereby be made.

The disclosure is in a further aspect based on a gear element, in particular an eccentric disk, of a cam mechanism of an oscillating garden device, in particular a hedge trimmer, shrub shears, grass shears and/or pruning shears, having at least one rotational axis and having at least one guide portion for at least one element to be guided, wherein the guide portion is configured such that it is closed with respect to the rotational axis in the peripheral direction.

It is proposed that the guide portion is arranged eccentrically to the rotational axis, and in the peripheral direction, in particular when viewed in a direction parallel to the rotational axis, deviates at least substantially from a circular and/or annular shape, whereby advantageous characteristics in relation to gardening, in particular advantageous cutting characteristics, can be attained. Furthermore a simple design can be enabled.

A further aspect of the disclosure is based on a method using an oscillating gardening device, in particular a hedge trimmer, shrubs shears, grass shears and/or pruning shears, having a processing tool which in an operating state is driven in oscillation cycles.

It is proposed that the oscillation cycles are respectively divided into at least two processing phases, whereby advantageous gardening characteristics, in particular advantageous cutting characteristics, can be obtained.

In the method, in particular the gear element with guide portion which is arranged eccentrically to the rotational axis and in the peripheral direction deviates at least substantially from a circular and/or annular shape can here be used. Alternatively or additionally hereto, the drive unit, in particular by means of pulse-width modulation, could be controlled such that different rotation speeds for different angular positions of the output shaft of the drive unit are obtained. In particular, a circular and/or annular, eccentrically mounted guide portion, in particular a circular eccentric disk, could in this case also be used. Furthermore for the division of the oscillation cycles into the at least two processing phases, at least one shape-change material, in particular a piezoelement, and/or at least one linear actuator could be employed, wherein in particular a shape of the guide portion, in particular of the eccentric disk, could be adapted, preferably dynamically, in particular with due regard to at least one environmental and/or operating parameter.

In a further aspect of the disclosure, which in particular taken in isolation, as well as in combination with previously stated aspects of the disclosure, is conceivable, there is proposed a processing tool which has at least two at least substantially parallelly arranged blades having respectively two longitudinal edges which respectively have a multiplicity of teeth, wherein, in the event that the teeth of the blades on one side of the processing tool are placed one above another, the teeth of the blades on the other side of the processing tool are arranged offset from one another. By virtue of such a design, a lower eccentricity of a cam mechanism can be achieved, at the same time as a maximum opening width between the teeth is maintained. Furthermore, a relative range of movement of the blades relative to one another decreases. Thus vibrations and disturbing noises can be reduced, and cutting efficiency and service life increased, in particular due to a lower load upon a drive unit and/or upon the cam mechanism.

Advantageously, the teeth on the other side of the processing tool are arranged offset from one another in such a way that mutually facing flanks of the teeth are arranged at least substantially one above another. A width of cut can hereby advantageously be enlarged.

The oscillating gardening device according to the disclosure should herein not be confined to the above-described application and embodiment. In particular, the oscillating gardening device, for the fulfillment of a working method described herein, can have a number of individual elements, component and units, which number deviates from a number stated herein.

BRIEF DESCRIPTION OF THE DRAWINGS

Further advantages emerge from the following description of the drawing. In the drawing, illustrative embodiments of the disclosure are represented. The drawing, the description and the claims contain numerous features in combination. The person skilled in the art will expediently also view the features individually and put them together into sensible further combinations.

In the drawing.

DETAILED DESCRIPTION

Figure 1:
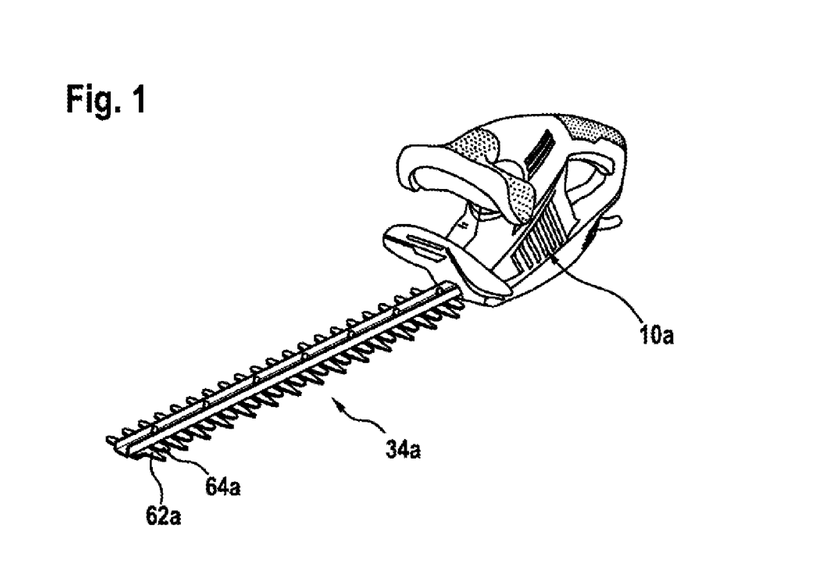
FIG. 1 shows in an isometric schematic representation an oscillating gardening device, configured as a hedge trimmer, with a processing tool.

FIG. 1 shows an oscillating gardening device in an isometric representation. The oscillating gardening device is configured as a hedge trimmer. Alternatively or additionally, the oscillating gardening device can also be configured as grass shears, shrub shears and/or pruning shears. The oscillating gardening device has a processing tool 34a. The processing tool 34a has two blades 62a, 64a, which are movable relative to each other. Furthermore, the oscillating gardening device has a drive unit 10a, which in an operating state is provided for driving of the processing tool 34a. The drive unit 10a can herein be provided to drive one or both of the blades 62a, 64a. In the present case, the drive unit 10a is provided to move both blades 62a, 64a relative to each other. In alternative embodiments, a processing tool can also have just one or more than two blades, wherein, in particular, more than two blades can also be driven.

Figure 2:
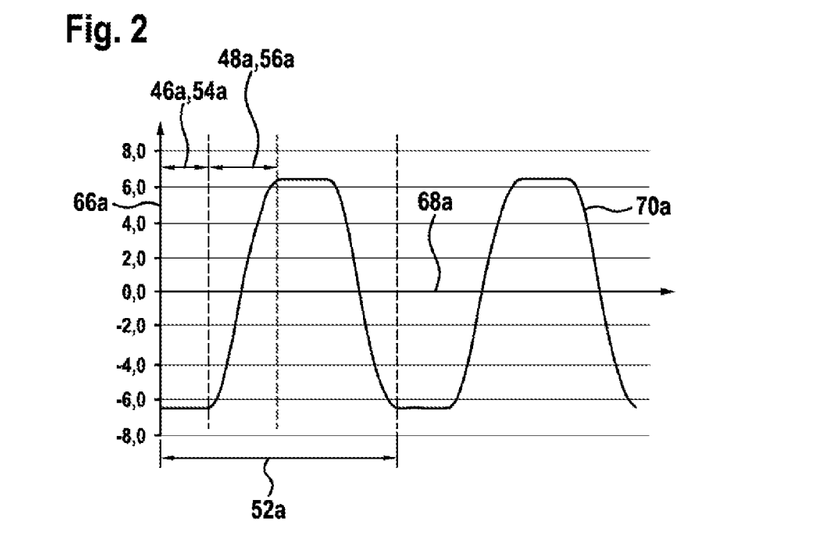
FIG. 2 shows in a schematic graph a temporal development of a displacement of a blade of the processing tool with respect to a rest position.
Figure 3:
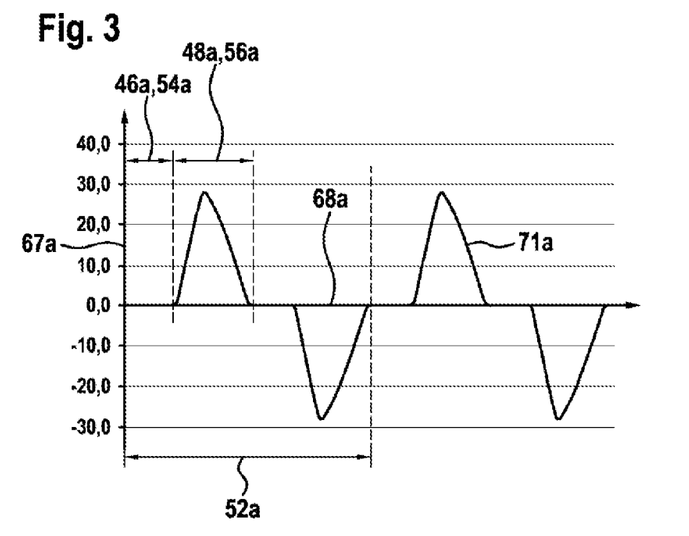
FIG. 3 shows in a schematic graph a temporal development of a speed of the blade from FIG. 2.

The drive unit 10a is provided to drive the processing tool 34a in oscillation cycles 52a. In this regard, FIG. 2 shows in a schematic graph a temporal development of a displacement of one of the blades 62a, 64a with respect to a rest position, given a uniform driving of the processing tool 34a by the drive unit 10a. In this context, on an ordinate 66a is plotted the displacement of the blade 62a, 64a with respect to the rest position "0" in millimeters, and on an abscissa 68a is plotted the time or an angular setting of a gear element 44a of a cam mechanism 12a of the oscillating gardening device (cf. FIG. 4). A curve 70a shows the temporal development of the displacement of the blade 62a, 64a. FIG. 3 shows in a schematic graph a temporal development of a speed of the blade 62a, 64a given a uniform driving of the processing tool 34a by the drive unit 10a at a rotation speed of the gear element 44a of 1300 revolutions per minute. On an ordinate 67a is herein plotted the speed of the blade 62a, 64a in millimeters per second and, on an abscissa 68a is plotted the time or the angular setting of the gear element 44a. A curve 71a indicates the temporal development of the speed of the blade 62a, 64a. A displacement and movement of the other blade 64a, 62a is here precisely opposite in direction. The oscillating gardening device is provided for the implantation of a method in which the oscillation cycles 52a are respectively divided into at least two processing phases 46a, 48a. In this context, an oscillation cycle 52a is characterized by precisely a complete revolution of the gear element 44a (cf. FIG. 4). The processing phases 46a, 48a occur twice per oscillation cycle 52a, plus and minus signs for the displacement and speed being herein reversed.

Figure 4:
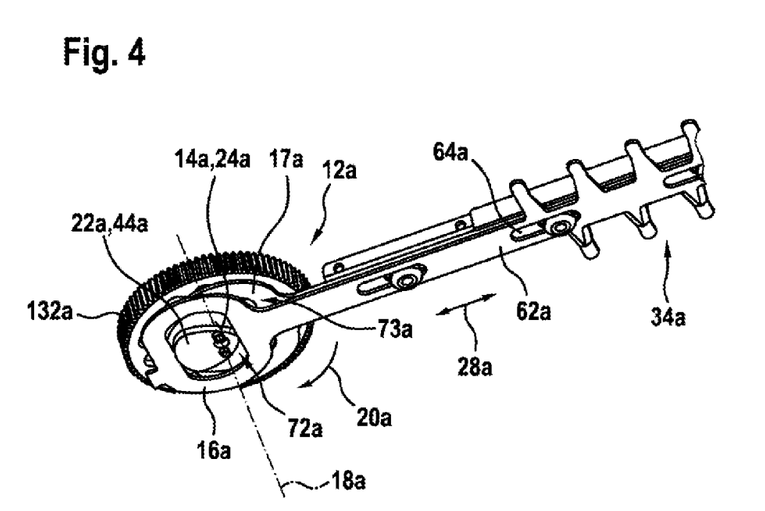
FIG. 4 shows in a schematic isometric representation a cam mechanism of the oscillating gardening device.

FIG. 4 shows the cam mechanism 12a of the oscillating gardening device in a schematic isometric representation. The cam mechanism 12a can be rotary driven by the drive unit 10a via a drive wheel 132a of the cam mechanism 12a. The gear element 44a is provided to be driven by the drive unit 10a rotatingly about a rotational axis 18a. The gear element 44a is configured as an eccentric disk 22a. The eccentric disk 22a comprises a guide portion 14a, which is configured as a, with respect to the rotational axis 18a, radial outer face 24a of the eccentric disk 22a, and which is configured such that it is closed with respect to the rotational axis 18a in the peripheral direction 20a. The guide portion 14a is arranged, moreover, eccentrically to the rotational axis 18a. The eccentric disk 22 engages in an annular recess 72a of an element to be guided 16a of the cam mechanism 12a. The element to be guided 16a is in particular connected in one piece to the blade 62a and drives this axially along a direction 28a.

The cam mechanism 12a also comprises a further gear element configured identically to the gear element 44a (not visible in FIG. 4). The further gear element can be rotated in relation to the gear element 44a, when viewed in a direction along the rotational axis 18a, through 180° about the rotational axis 18a, or can be arranged in mirror symmetry to a mirror plane containing the rotational axis 18a and lying perpendicular to the direction 28a. The further gear element engages in a further annular recess 73a of a further element to be guided 17a of the cam mechanism 12a, which is in particular connected in one piece to the blade 64a. The gear element 44a and the further gear element are fixedly connected to each other and driven via a common shaft by means of the drive wheel 132a. In the event that a processing tool has further driven blades, further gear elements could correspondingly be provided.

Figure 5:
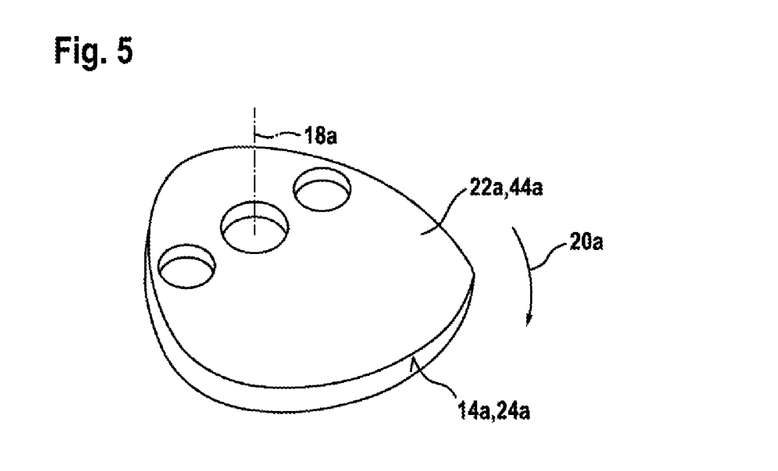
FIG. 5 shows in a schematic isometric representation a gear element, configured as an eccentric disk, of the cam mechanism.

FIG. 5 shows the eccentric disk 22a in a schematic isometric representation. In order to obtain a division of the oscillation cycles 52a into at least two processing phases 46a, 48a, the eccentric disk 22a, and thus also the guide portion 14a, in the peripheral direction 20a, in particular when viewed in a direction parallel to the rotational axis 18a, deviates at least substantially from a circular shape. The guide portion 14a is, moreover, free from a mirror symmetry with respect to a mirror symmetry plane containing the rotational axis 18a, and free from an n-fold rotational symmetry with respect to a rotational symmetry axis parallel to the rotational axis 18a.

Figure 6:
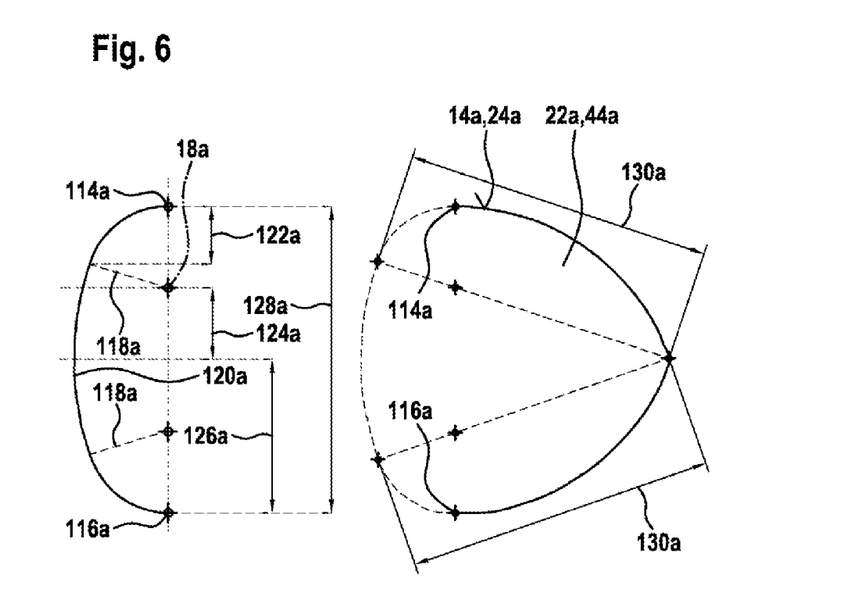
FIG. 6 shows the gear element in a schematic top view with measurement data.

FIG. 6 shows the eccentric disk 22a in a schematic top view with measurement data. The eccentric disk 22a is split, for the sake of clarity, into two parts, which should be thought of as put together at the points 114a, 116a. A radius 118a measures 7.320 mm. A radius of a circular arc 120a measures 26.500 mm. A length 122a measures 4.866 mm. A length 124a measures 6.430 mm. A length 126a measures 13.750 mm. A length 128a measures 27.500 mm. A length 130a measures 27.500 mm.

Figure 7:
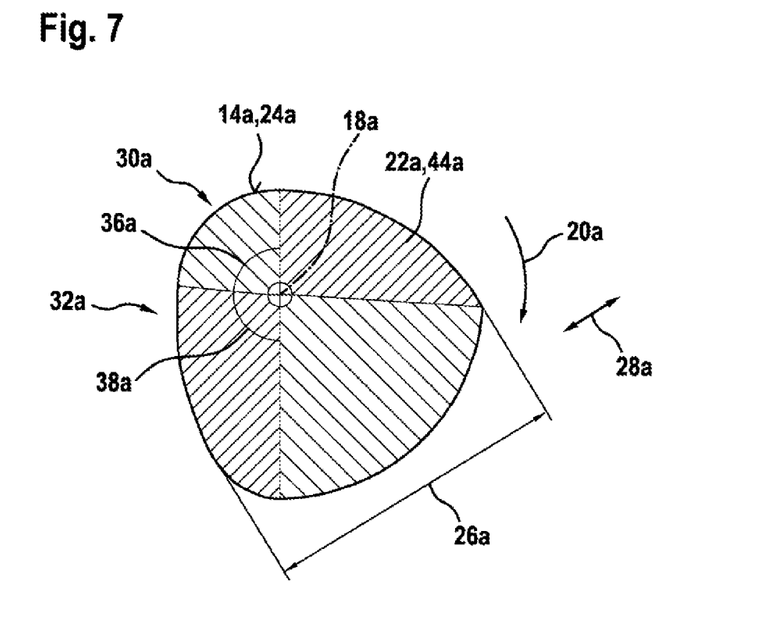
FIG. 7 shows the gear element in a schematic top view with marked segments of a guide portion, by which different processing phases of an oscillation cycle of the processing tool are identified.

FIG. 7 shows the eccentric disk 22a in a schematic top view. An extent 26a of the eccentric disk 22a along the direction 28a perpendicular to the rotational axis 18a is equal for all rotational positions of the eccentric disk 22a about the rotational axis 18a. The extent 26a here corresponds at least substantially to an extent of the recess 72a along the direction 28a (cf. FIG. 4), whereby it is in particular ensured that the eccentric disk 22a always sits in an at least substantially precisely fitting manner in the recess 72a.

The guide portion 14a has at least a first segment 30a and at least a second segment 32a different from the first segment 30a, by which segments the different processing phases 46a, 48a of the oscillation cycle 52a of the processing tool 34a are identified (cf. FIGS. 2 and 3). The segments 30a, 32a are herein marked in the figures by different hatchings. The segments 30a, 32a respectively comprise two parts, which lie opposite one another with regard to the rotational axis 18a and which, in one of the processing phases 46a, 48a, bear at least substantially against mutually opposite rims, bounding the recess 72a, of the element to be guided 16a.

The first segment 30a is assigned to the processing phase 46a. The first segment 30a extends with respect to the rotational axis 18a over a first angular range 36a of 80° to 90°, in particular of 85°. The first segment 30a describes with respect to the rotational axis 18a a circular arc, in order to at least substantially temporarily halt a movement of the processing tool 34a. Consequently, the processing phase 46a constitutes a holding phase 54a (cf. FIGS. 2 and 3). In the holding phase 54a, an opening between teeth of the blades 62a, 64a is kept open for a lengthy period in order to achieve an advantageous take-up, between the teeth, of material to be cut. In particular, it can thus be ensured that relatively thin branches end up in the opening between the teeth. Furthermore, sufficient time is provided to allow even relatively thick branches a secure take-up in the opening between the teeth. As a result, in particular an undesirable force effect on the material to be cut can be reduced, whereby in particular a cutting and/or shaping of shrubs and/or hedges can be simplified. Since, during the holding phase 54a, no friction is generated between the blades 62a, 64a, an advantageous acceleration of the drive unit 10a can, furthermore, subsequently be achieved.

The second segment 32a is assigned to the processing phase 48a. The second segment 32a extends with respect to the rotational axis 18a over a second angular range 38a of 90° to 100°, in particular of 95°. The second segment 32a describes with respect to the rotational axis 18a a part of a spiral, in order to provide an accelerated movement of the processing tool 34a. The processing phase 48a constitutes a cutting phase 56a (cf. FIGS. 2 and 3). In the cutting phase 56a, the material to be cut which is present between the teeth of the blade 62a, 64a is cut up cleanly in an accelerated movement of the teeth relative to one another, whereby in particular an undesirable force effect on the material to be cut can once again be reduced.

The first angular range 36a and the second angular range 38a add up to 180°.

In FIGS. 8 to 18, further illustrative embodiments of the disclosure are shown. The following description and the figures substantially confine themselves to the differences between the illustrative embodiments, wherein, with respect to like-labeled components, in particular with regard to components with same reference symbols, reference can fundamentally also be made to the figures and/or the description of the other illustrative embodiments, in particular of FIGS. 1 to 7. In order to differentiate between the illustrative embodiments, the letter "a" is suffixed to the reference symbols of the illustrative embodiment in FIGS. 1 to 7. In the illustrative embodiments of FIGS. 8 to 18, the letter "a" is replaced by the letters "b", "c", "d" and "e".

Figure 8:
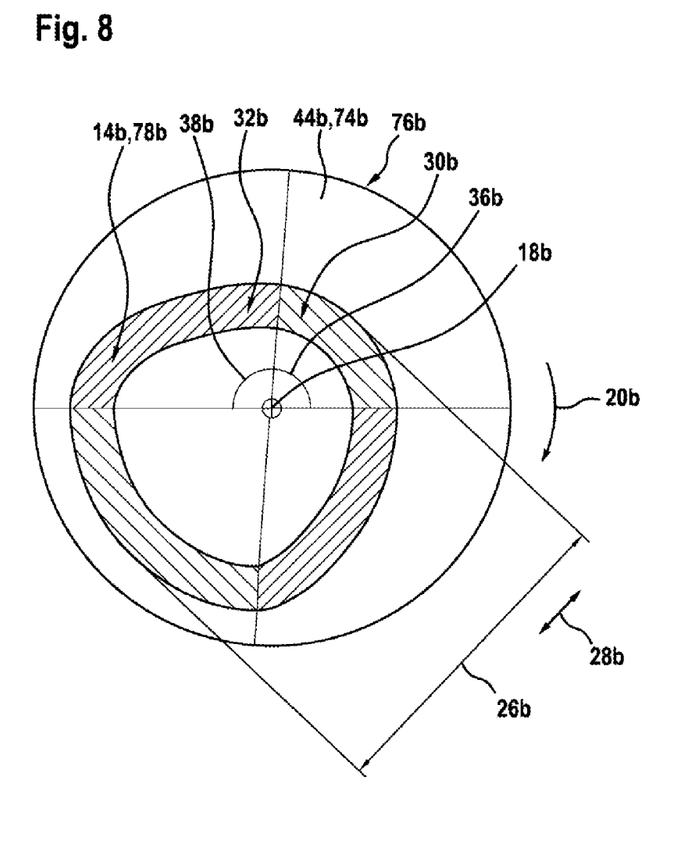
FIG. 8 shows a gear element, configured as a cam disk, of a cam mechanism of an alternative oscillating gardening device in a schematic top view with marked segments, by which different processing phases of an oscillation cycle of a processing tool are identified.

FIG. 8 shows in a schematic top view a gear element 44b, configured as a cam disk 74b, of a cam mechanism of an alternative oscillating gardening device. The gear element 44b is in particular provided to at least substantially generate the same motional sequence of a processing tool as the gear element 44a from the preceding illustrative embodiment (cf. FIGS. 2 and 3). The cam disk 74b is mounted rotationally about a rotational axis 18b which lies in the center of a circle defined by an outer rim 76b of the cam disk 74b. The gear element 44b has a guide portion 14b, which is configured as a guide groove 78b and, in particular, is provided to guide an element (not represented), which in particular is connected preferably in one piece to at least one blade of the processing tool. The guide portion 14b is configured such that it is rotatable about the rotational axis 18b and is closed with respect to the latter in the peripheral direction 20b. The guide portion 14b is arranged eccentrically to the rotational axis 18b and deviates in the peripheral direction 20b, in particular when viewed along a direction parallel to the rotational axis 18b, at least substantially from an annular shape. A first segment 30b and a second segment 32b of the guide groove 78b are shown in hatched representation for greater clarity. Though an extent 26b of the guide portion 14b along a direction 28b perpendicular to the rotational axis 18b is in the present illustrative embodiment the same for all rotational positions of the guide portion 14b about the rotational axis 18b, this does not have to be the case if the gear element 44b is designed as a cam disk 74b.

Figure 9:
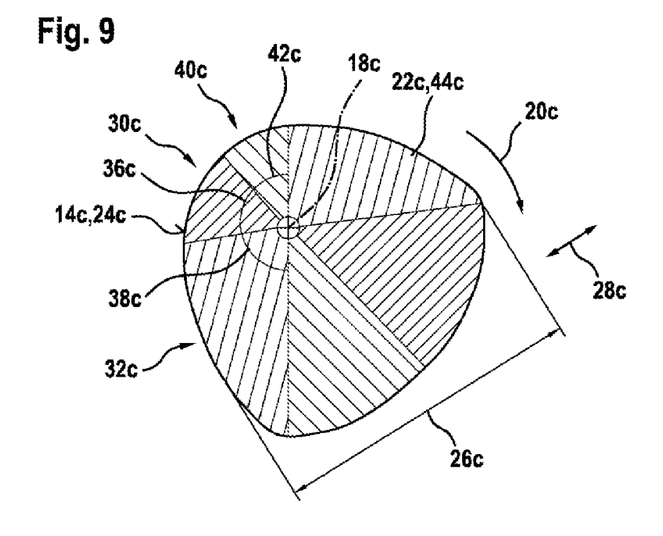
FIG. 9 shows a gear element, configured as an eccentric disk, of a cam mechanism of a further oscillating gardening device in a schematic top view with marked segments, by which different processing phases of an oscillation cycle of the processing tool are identified.
Figure 10:
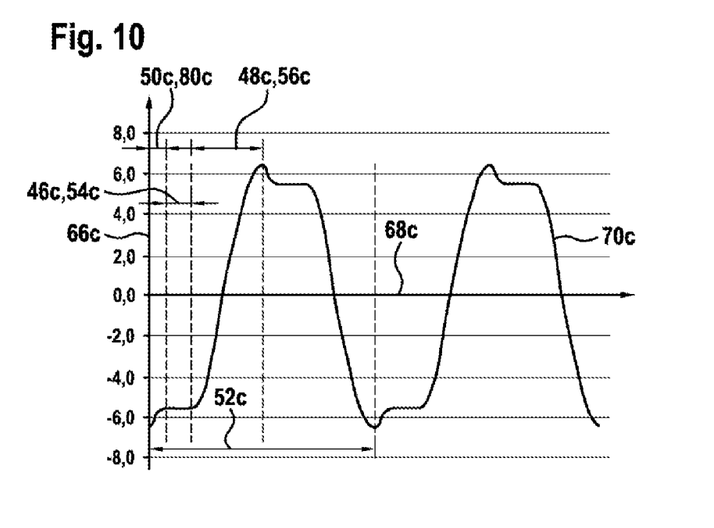
FIG. 10 shows in a schematic graph a temporal development of a displacement of a blade of the processing tool from FIG. 9 with respect to a rest position.
Figure 11:
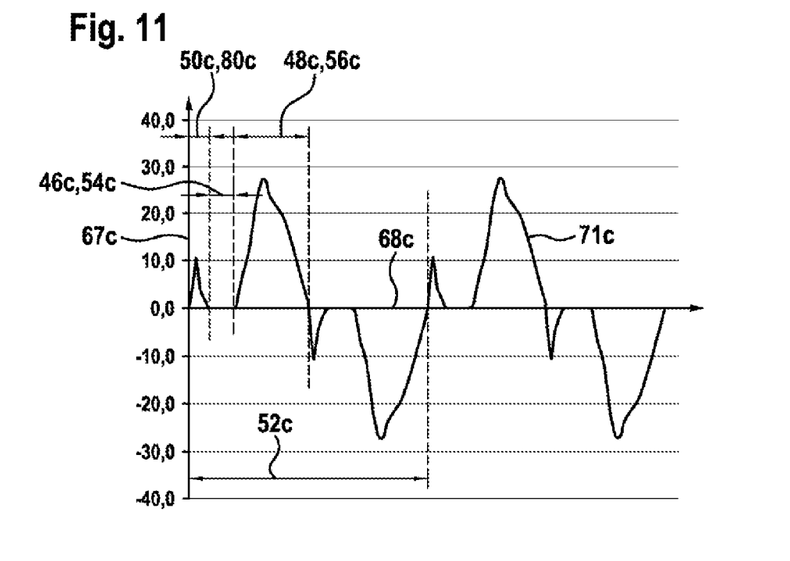
FIG. 11 shows in a schematic graph a temporal development of a speed of the blade from FIG. 10.

FIG. 9 shows in a schematic top view a gear element 44c, configured as an eccentric disk 22c, of a cam mechanism of a further oscillating gardening device. The gear element 44c is provided to provide a relative movement of blades of a processing tool of the oscillating gardening device according to the schematic graphs shown in FIGS. 10 and 11. An extent 26c of the eccentric disk 22c along a direction 28c perpendicular to a rotational axis 18c is the same for all rotational positions of the eccentric disk 22c about the rotational axis 18c. The eccentric disk 22c comprises a guide portion 14c, which is configured as a, with respect to the rotational axis 18c, radial outer face 24c of the eccentric disk 22c and which is configured such that it is closed with respect to the rotational axis 18c in the peripheral direction 20c. The guide portion 14c is arranged, moreover, eccentrically to the rotational axis 18c.

The guide portion 14c has a first segment 30c and a second segment 32c different from the first segment 30c. The guide portion 14c further has a third segment 40c different from the first segment 30c and from the second segment 32c. The segments 30c, 32c, 40c adjoin one another in the peripheral direction 20c. By the segments 30c, 32c, 40c, different processing phases 46c, 48c, 50c of an oscillation cycle 52c of the processing tool are identified (cf. FIGS. 10 and 11).

The third segment 40c is assigned to the processing phase 50c. The third segment 40c extends with respect to the rotational axis 18c over a third angular range 42c of 40° to 50°, in particular of 45°. The third segment 40c describes with respect to the rotational axis 18c a part of a spiral, in order to provide a movement of the processing tool. The processing phase 50c constitutes a preparation phase 80c (cf. FIGS. 10 and 11). In the preparation phase 80c, an opening between teeth of the blades of the processing tool, in particular in a relatively fast movement, is closed slightly, in order thereby to obtain a saw like effect with regard to thick branches. Furthermore, thick branches are prevented from getting entangled between the teeth and from possibly leading to a blockage and/or stoppage of a drive unit.

The first segment 30c is assigned to the processing phase 46c. The first segment 30c extends with respect to the rotational axis 18c over a first angular range 36c of 50° to 60°, in particular of 55°. The first segment 30c describes with respect to the rotational axis 18c a circular arc, in order to at least substantially temporarily halt a movement of the processing tool. Viewed in the peripheral direction 20c, the first segment 30c is disposed downstream of the third segment 40c. The processing phase 46c constitutes a holding phase 54c (cf. FIGS. 10 and 11). In the holding phase 54c, an opening between the teeth of the blades is kept open for a lengthy period in order to achieve an advantageous take-up, between the teeth, of the material to be cut, in particular of relatively thin branches which can be cut in one run. As a result, in particular an undesirable force effect on the material to be cut can be reduced, whereby in particular a cutting and/or shaping of shrubs and/or hedges can be simplified. Since, during the holding phase 54c, no friction is generated between the blades, an advantageous acceleration of a drive unit 10a can, furthermore, subsequently be achieved.

The second segment 32c is assigned to the processing phase 48c. The second segment 32c extends with respect to the rotational axis 18c over a second angular range 38c of 75° to 85°, in particular of 80°. The second segment 32c describes with respect to the rotational axis 18c a part of a spiral, in order to provide an accelerated movement of the processing tool. Viewed in the peripheral direction 20c, the second segment 40c is disposed downstream of the first segment 30c. The processing phase 48c constitutes a cutting phase 56c (cf. FIGS. 10 and 11). In the cutting phase 56c, the material to be cut which is present between the teeth of the blade is cut up completely and cleanly in a movement of the teeth relative to one another.

The first angular range 36c, the second angular range 38c and the third angular range 42c add up to 180°.

Figure 12:
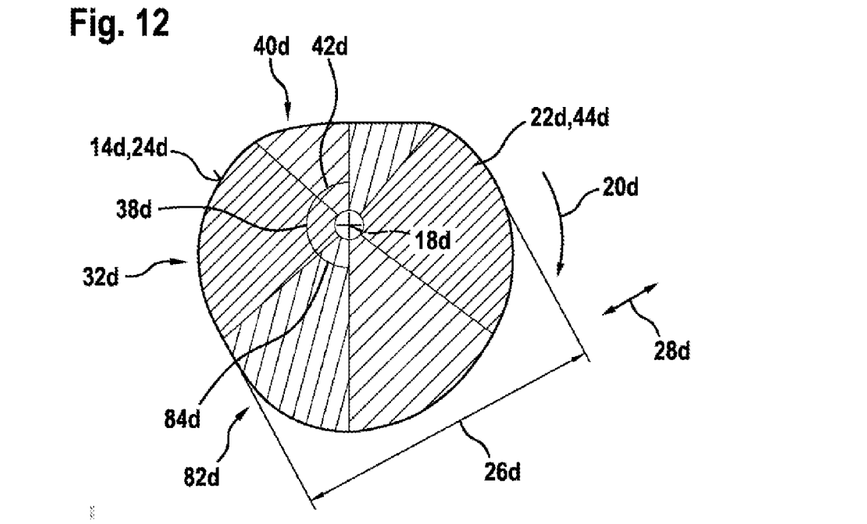
FIG. 12 shows a gear element, configured as an eccentric disk, of a cam mechanism of a further alternative oscillating gardening device in a schematic top view with marked segments, by which different processing phases of an oscillation cycle of a processing tool are identified.
Figure 13:
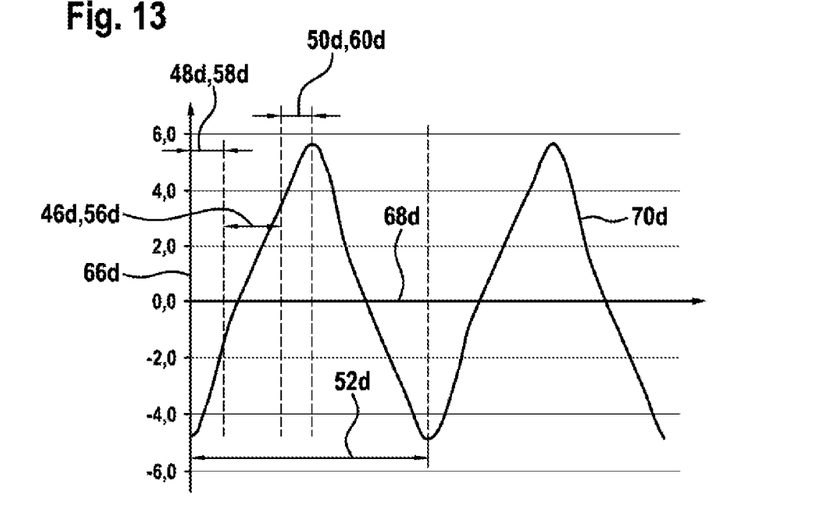
FIG. 13 shows in a schematic graph a temporal development of a displacement of a blade of the processing tool from FIG. 12 with respect to a rest position.
Figure 14:
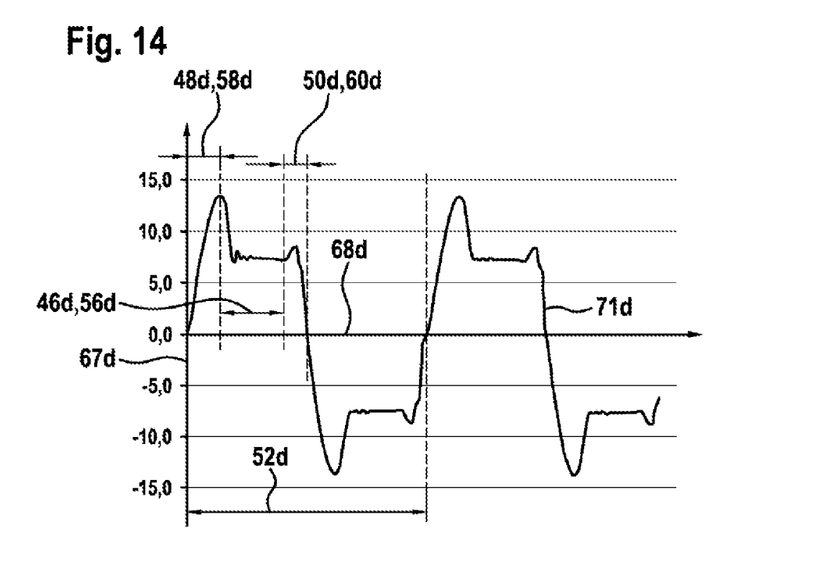
FIG. 14 shows in a schematic graph a temporal development of a speed of the blade from FIG. 13.

FIG. 12 shows in a schematic top view a gear element 44d, configured as an eccentric disk 22d, of a cam mechanism of a further alternative oscillating gardening device. The gear element 44d is provided to provide a relative movement of blades of a processing tool of the oscillating gardening device according to the schematic graphs shown in FIGS. 13 and 14. The processing tool is here, in particular, suitable for cutting dry wood.

A guide portion 14d of the cam mechanism has a second segment 32d and a third segment 40d different from the second segment 32d. The guide portion 14d further has a fourth segment 82d different from the second segment 32d and from the third segment 40d. The segments 32d, 40d, 82d adjoin one another in the peripheral direction 20d. By the segments 32d, 40d, 82d, different processing phases 46d, 48d, 50d of an oscillation cycle 52d of the processing tool are identified (cf. FIGS. 13 and 14).

The third segment 40d is assigned to the processing phase 48d. The third segment 40d extends with respect to the rotational axis 18d over a third angular range 42d of 40° to 50°, in particular of 45°. The third segment 40d describes with respect to the rotational axis 18d a part of a spiral. The processing phase 48d constitutes a cutting phase 58d (cf. FIGS. 13 and 14). In the cutting phase 58d, an opening between teeth of the blades of the processing tool is made smaller in order, in particular, to cut into thick branches. At a relatively high cutting speed, a relatively small cutting force is hereupon generated. The aim of the cutting phase 58d is to reduce a force which is necessary for a complete cut-through.

The second segment 32d is assigned to the processing phase 46d. The second segment 32d extends with respect to a rotational axis 18d over a second angular range 38d of 80° to 90°, in particular of 85°. The second segment 32d describes with respect to the rotational axis 18d a part of a spiral, in order to prevent a, in comparison to the third segment 40d, slower movement of the processing tool. Viewed in the peripheral direction 20d, the second segment 32d is disposed downstream of the third segment 40d. The processing phase 46d constitutes a cutting phase 56d (cf. FIGS. 13 and 14). In the cutting phase 56d, a relative speed of the teeth of the blades relative to one another is reduced, in order thereby to provide a higher cutting force. The necessary cutting force namely generally rises as soon as branches have been partially cut into. The material to be cut which is present between the teeth is then cut up in a relatively slow movement with relatively high cutting force.

The fourth segment 82d is assigned to the processing phase 50d. The fourth segment 82d extends with respect to the rotational axis 18d over a fourth angular range 84d of 45° to 55°, in particular of 50°. The fourth segment 82d describes with respect to the rotational axis 18d a part of a spiral, in order to prevent a, in comparison to the second segment 32d, faster movement of the processing tool. Viewed in the peripheral direction 20d, the fourth segment 82d is disposed downstream of the second segment 32d. The processing phase 50d constitutes a cutting phase 60d (cf. FIGS. 13 and 14). In the cutting phase 60d, a relative speed of the teeth of the blades relative to one another is increased again, whereby a provided cutting force falls again. The necessary cutting force generally decreases again, in particular heavily, toward the end of the cutting process. The material to be cut which is present between the teeth is cut up completely and cleanly, in a relatively fast movement, with relatively low cutting force.

The second angular range 38d, the third angular range 42d and the fourth angular range 84d add up to 180°.

Figure 15:
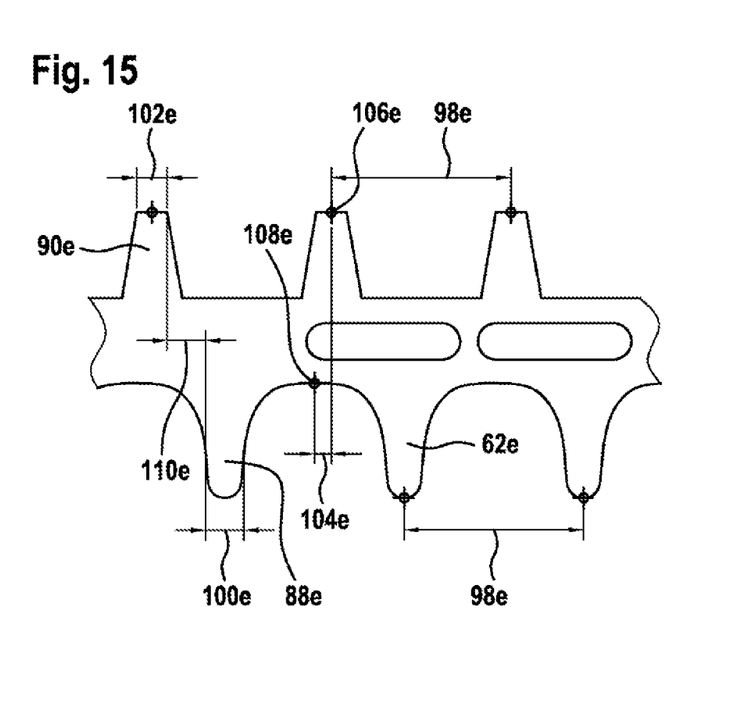
FIG. 15 shows in a schematic top view one of two identical blades of a processing tool of a further oscillating gardening device.
Figure 16:
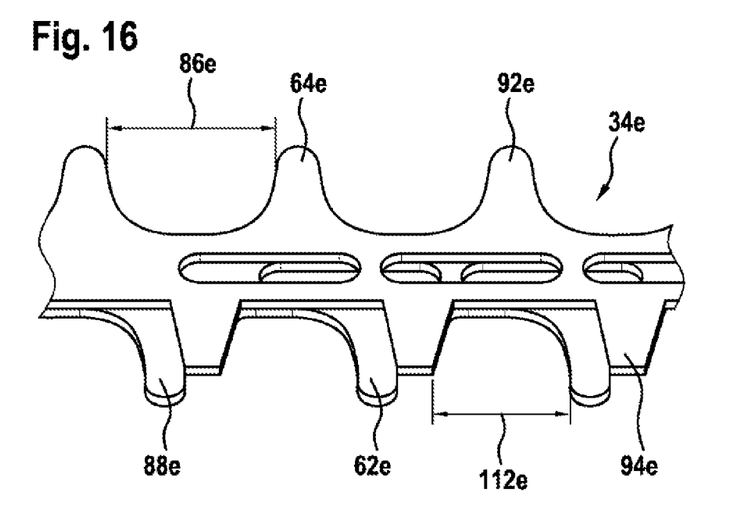
FIG. 16 shows in a schematic isometric representation the processing tool from FIG. 15 in a first setting of the blades one to another.

FIG. 15 shows in a schematic top view one of two identical blades 62e, 64e of a processing tool 34e of a further oscillating gardening device. FIG. 16 shows in a schematic isometric representation the processing tool 34e in a first setting of the blades 62e, 64e relative to one another, and FIG. 17 contains a corresponding view of the processing tool 34e in a second relative setting of the blades 62e, 64e.

The processing tool 34e can be combined with a cam mechanism of any chosen design, in particular including with all cam mechanisms 12a from the preceding illustrative embodiments of FIGS. 1 to 14. The processing tool 34e is provided to, in particular also in combination with a gear element 44e of a cam mechanism having an eccentric and circular guide portion 14e, reduce an eccentricity 96e of the guide portion 14e (cf. FIG. 18), and nevertheless to maintain a maximum opening width 86e between teeth 88e, 90e, 92e, 94e of the blades 62e, 64e. With the gear element 44e according to FIG. 18, which is employed in the present case, both blades 62e, 64e are moved. Upon this movement, circular eccentric disks 22e, which are mounted jointly about a rotational axis 18e and are fixedly connected to one another, respectively engage in a recess (not represented) of an element to be guided, wherein each element to be guided is connected fixedly, preferably in one piece, to one of the blades 62e, 64e. Alternatively, it would also be conceivable for just one of the blades 62e, 64e to undergo a movement. In this case, the gear element 44e would have merely an eccentric disk 22e.

The blades 62e, 64e are constructed identically to each other, so that, below, merely the blade 62e is described on the basis of FIG. 15. The blade 62e has two longitudinal edges having two sets of teeth 88e, 90e of different type (in the figures, for the sake of clarity, respectively only one tooth of a type is provided with a reference symbol). The first longitudinal edge has teeth 88e of a first type, and the second longitudinal edge has teeth 90e of a second type. A centerpoint-to-centerpoint spacing 98e of the teeth 88e, 90e is identical for all directly adjacent teeth and measures, in particular, 42 mm. A first tooth width 100e of the first type of teeth 88e measures 8 mm. A second tooth width 102e of the second type of teeth 90e measures 7 mm. The teeth 88e of the first longitudinal edge of the blade 62e are offset from the teeth 90e of the second longitudinal edge of the blade 62e. The teeth 88e of the first longitudinal edge are here arranged eccentrically to the teeth 90e of the second longitudinal edge. More precisely, in the longitudinal direction of the blade 62e, a distance 104e exists between a tooth center 106e of a tooth 90e of the second longitudinal edge and a nearest center of tooth space clearance 108e between adjacent teeth 88e of the first longitudinal edge. A minimum flank clearance 110e between flanks of teeth 88e, 90e of different longitudinal edges of the blade 62e measures 9.75 mm. A flank clearance between, in a cutting process, leading flanks of teeth 88e, 90e of different longitudinal edges of the blade 62e corresponds to double the eccentricity 96e. The flank clearance between, in a cutting process, leading flanks of teeth 88e, 90e of different longitudinal edges of the blade 62e measures, in the present case, 17.25 mm.

Figure 17:
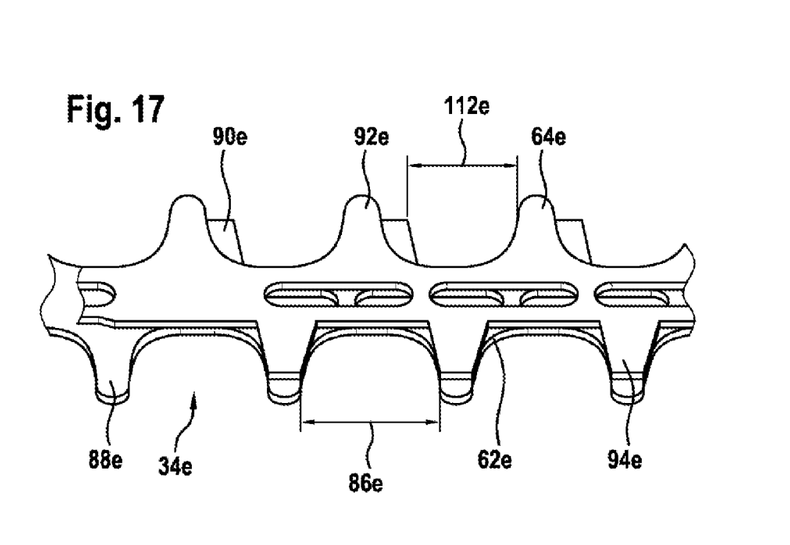
FIG. 17 shows in a schematic isometric representation the processing tool from FIG. 15 in a second setting of the blades one to another.

FIGS. 16 and 17 show the processing tool 34e in two different settings during an oscillation cycle of the processing tool 34e. During the oscillation cycle, it is the case that if the teeth 88e, 90e, 92e, 94e of the blades 62e, 64e on one side of the processing tool 34e be placed one above another, the teeth 88e, 90e, 92e, 94e of the blades 62e, 64e on the other side of the processing tool 34e are arranged offset from one another, to be precise such that mutually facing flanks of the teeth 88e, 90e, 92e, 94e of the blades 62e, 64e are arranged at least substantially one above another. The blades 62e, 64e begin the oscillation cycle such that the teeth 88e, 90e, 92e, 94e of one of the longitudinal edges of the blades 62e, 64e lie directly one above another (cf. the state from FIG. 16). At this moment, the maximum opening width 86e is reached on the corresponding longitudinal edge. After half a revolution of the eccentric disks 22e, the teeth 88e, 90e, 92e, 94e of one of the longitudinal edge of the longitudinal edge have moved closer together such that the mutually facing flanks of the teeth 88e, 90e, 92e, 94e on the longitudinal edge are arranged at least substantially one above another. An opening width 112e is then reduced by a mean value of the first tooth width 100e and of the second tooth width 102e in relation to the maximum opening width 86e (cf. the state from FIG. 17). At this moment, the maximum opening width 86e is reached on the opposite longitudinal edge. After a full revolution of the eccentric disk 22e, the state from FIG. 16 is obtained once again.

Figure 18:
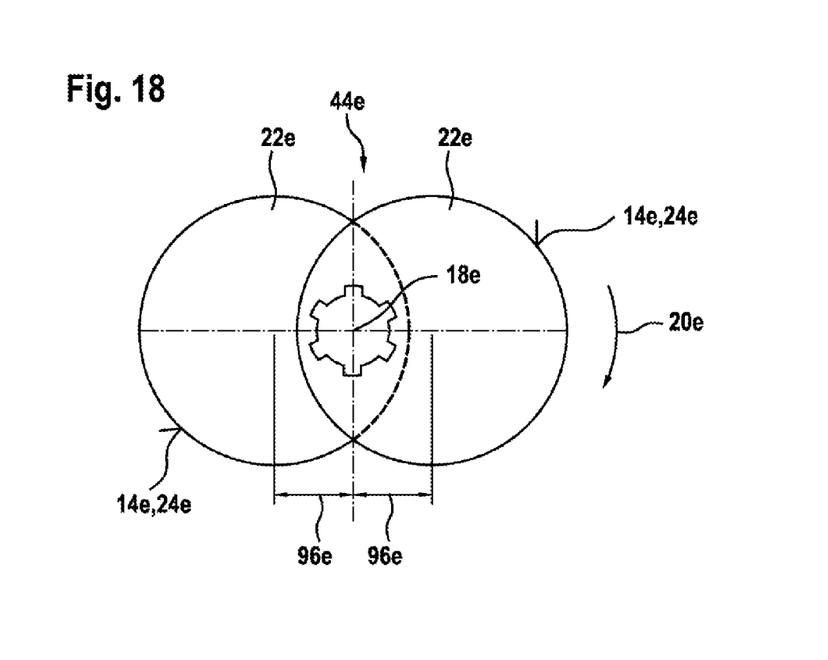
FIG. 18 shows in a schematic top view a gear element of a cam mechanism of the oscillating gardening device from FIG. 15.

The maximum opening width 86e measures, in the present case, 34 mm. An eccentricity 96e of the guide portion 14e of the cam mechanism measures 8.625 mm. A relative range of movement of the blades 62e, 64e relative to each other corresponds to four times the eccentricity 96e, to be precise in particular 34.5 mm. The maximum opening width 86e per revolution of the eccentric disks 22e is reached once on each longitudinal edge, in particular, in contrast to the prior art, with a central arrangement of teeth of longitudinal edges of blades, where a maximum opening width per revolution of an eccentric disk with greater eccentricity is reached twice on a longitudinal edge.

By virtue of such a design, a lower eccentricity 96e can be attained, at the same time as the maximum opening width 86e between teeth 88e, 90e, 92e, 94e is maintained. Furthermore, a relative range of movement of the blades 62e, 64e relative to each other decreases. Thus, vibrations and disturbing noises can be reduced and cutting efficiency and service life increased, in particular due to a lower load upon a drive unit and/or upon the cam mechanism. Compared to a corresponding design with central arrangement of teeth according to the prior art, an approximately 18% reduction in the eccentricity and in the relative range of movement can be achieved, which leads to a corresponding reduction in speed, acceleration and force. In particular, an approximately 18% reduction in necessary drive torque can be achieved. That the maximum opening width 86e is less often reached is of only minor importance in practice, since most branches to be cut, in terms of their thickness, anyway lie, in particular, clearly below the maximum opening width 86e. Consequently, an overall cutting performance should be only slightly or not at all restricted, in particular considering the fact that, due to the lower eccentricity 96e, a duration of the oscillation cycles could be reduced and the drive unit could be operated, in particular, at a higher rotation frequency and thus possibly, depending on the construction, in particular at higher efficiency.

The invention claimed is:

1. An oscillating gardening device, comprising:
   a drive unit;
   at least one element configured to be moved in a direction of oscillation to a position of positive maximum extent in the direction of oscillation and to a position of negative maximum extent in the direction of oscillation;
   at least one processing tool extending from the at least one element and driven in an oscillation cycle based on oscillating movement of the at least one element; and
   a cam mechanism configured to be driven by the drive unit about a rotational axis perpendicular to the direction of oscillation, the cam mechanism including at least one eccentric disk having a guide portion configured as a radial outer face of the at least one eccentric disk with respect to the rotational axis, the guide portion configured to guide the at least one element in the direction of oscillation,
   wherein the guide portion is configured for rotation about the rotational axis and is closed with respect to the rotational axis in a peripheral direction,
   wherein the guide portion is arranged eccentrically to the rotational axis, and in the peripheral direction deviates at least substantially from a circular shape or an annular shape,
   wherein movement of the at least one element is halted during a first holding phase of the oscillation cycle and during a second holding phase of the oscillation cycle,
   wherein the guide portion is rotated by the drive unit during the first holding phase and the second holding phase,
   wherein the at least one element is halted at the position of positive maximum extent during the first holding phase,
   wherein the at least one element is halted at the position of negative maximum extent during the second holding phase, and
   wherein during rotation of the guide portion about the rotational axis, an extent of the eccentric disk along the direction of oscillation is equal for all rotational positions of the guide portion about the rotational axis.

2. The oscillating gardening device as claimed in claim 1, wherein:
   the guide portion has at least a first segment and at least a second segment different from the first segment, by which segments a first processing phase and a second processing phase of the oscillation cycle are defined, and the first holding phase corresponds to one of the first processing phase and the second processing phase.

3. The oscillating gardening device as claimed in claim 2, wherein:

the first segment describes one or more of a circular arc and an annular arc with respect to the rotational axis and corresponds to the first holding phase.

4. The oscillating gardening device as claimed in claim 2, wherein:

the second processing phase corresponds to a cutting phase, the second segment describes a part of a spiral in order to provide a movement of the at least one processing tool during the cutting phase, the cutting phase occurs between the first holding phase and the second holding phase.

5. The oscillating gardening device as claimed in claim 4, wherein:

the at least one processing tool includes a plurality of cutting teeth, an opening between corresponding cutting teeth of the plurality of cutting teeth is kept open during the first holding phase, the opening is kept open during the second holding phase, and the opening is closed during the cutting phase.

6. The oscillating gardening device as claimed in claim 2, wherein:

the first segment extends over a first angular range of 30° to 100° with respect to the rotational axis, and describes one or more of a circular arc and an annular arc, and the second segment adjoins the first segment in the peripheral direction, extends over a second angular range of 70° to 110° with respect to the rotational axis, and describes a part of a spiral.

7. The oscillating gardening device as claimed in claim 6, wherein the guide portion has at least a third segment different from the first segment and second segment, which third segment adjoins in the peripheral direction the first segment, extends over a third angular range of 30° to 60° with respect to the rotational axis, and describes a part of a spiral.

8. The oscillating gardening device as claimed in claim 1, wherein the oscillating gardening device is configured as one or more of a hedge trimmer, shrub shears, grass shears, and pruning shears.

9. The oscillating gardening device as claimed in claim 1, wherein:

the cam mechanism is rotated three hundred sixty degrees during the oscillation cycle, the first holding phase is present for at least thirty consecutive degrees of rotation of the cam mechanism, and the second holding phase is present for at least thirty consecutive degree of rotation of the cam mechanism.

* * * * *